Aug. 21, 1962     B. C. RANNEY     3,049,863
GLOBE AND CLOCK CONSTRUCTION
Filed April 26, 1960     2 Sheets-Sheet 1

Boivin C. Ranney
INVENTOR.

BY Clarence A. O'Brien
and Harvey B. Jacobson
Attorneys

Aug. 21, 1962  B. C. RANNEY  3,049,863
GLOBE AND CLOCK CONSTRUCTION
Filed April 26, 1960  2 Sheets-Sheet 2

Boivin C. Ranney
INVENTOR.

United States Patent Office 3,049,863
Patented Aug. 21, 1962

3,049,863
GLOBE AND CLOCK CONSTRUCTION
Boivin C. Ranney, New Albany, Ohio
Filed Apr. 26, 1960, Ser. No. 24,758
1 Claim. (Cl. 58—44)

This invention relates to a construction including a conventional electric clock and a world globe with means for housing the clock and globe and means for rotating the globe so as to permit the immediate determination of local time in various parts of the world.

It is appreciated that the world is divided into a plurality of different time zones or sectors defined by longitudinal north-south lines. Inasmuch as the earth rotates on its axis from west to east, time sectors successively have times which are one hour earlier as the earth is traversed from east to west. It of course would be desirable to provide a clock and globe construction wherein a person may immediately note the local time in the various portions of the world. Moreover, it is well appreciated that when the earth revolves about the sun, different seasons are defined in different parts of the world due to the inclination of the earth's axis of rotation, it would be preferable to provide a construction which indicates local time with means for indicating the seasons in different parts of the world.

In accordance with the above, it is the principal object of this invention to provide a novel globe and clock construction wherein a globe is utilized and means is provided for turning the globe by the clock to indicate local time in various parts of the world. Also, illuminating means are provided within the globe, either transparent or translucent for shading particular portions of the globe to create a tilting effect for indicating different seasons.

It is more particularly an object of this invention to provide a novel globe and clock construction which is relatively simple and accordingly inexpensive and durable. Both the cost of manufacture and the cost of maintenance are relatively low.

It is a still more particular object of this invention to provide in combination with an electric clock, a translucent globe with means being provided for drivingly connecting the clock driveshaft to the globe so as to turn the globe at a predetermined mechanically governed rate for continually indicating local time in various parts of the world. The construction disclosed allows for the utilization of a substantially conventional electric clock which requires few modifications for use in the manner indicated.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

Figure 1:
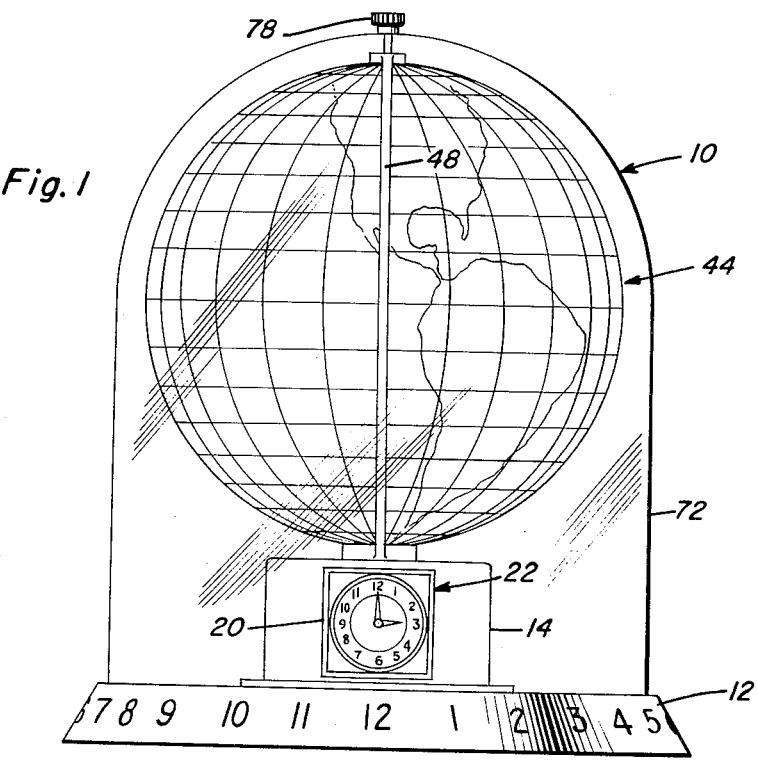
FIGURE 1 is a front elevational view of the invention illustrating particularly the external configuration thereof.
Figure 2:
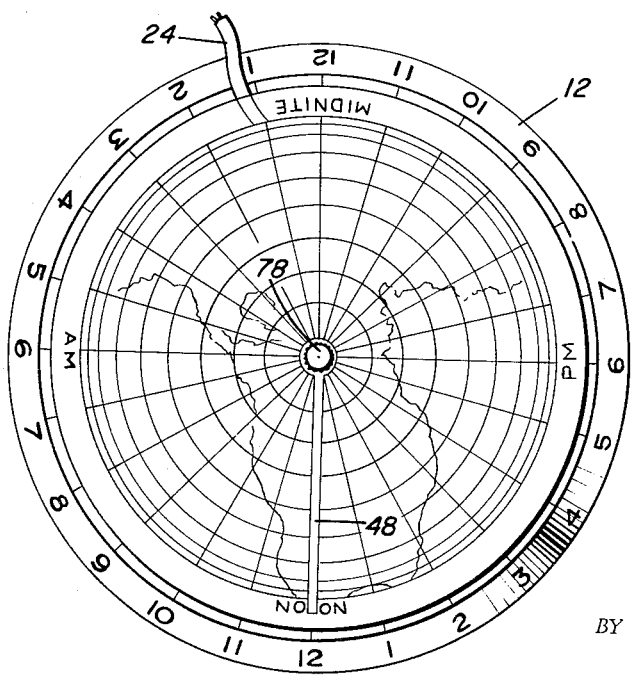
FIGURE 2 is a top plan view of the invention.

With continuing reference to the drawings, numeral 10 generally represents the globe and clock construction including a circular base 12 having twenty-four numerals inscribed or otherwise similarly displayed thereon representing the twenty-four different hours in a day. Further, indicating indicia as A.M. and P.M. may be utilized as particularly shown in FIGURE 2. Mounted on the central top portion of the base 12 is a casing 14 having a removable upper lid 16. The front vertical wall of casing 14 has an opening 18 through which may be seen the face 20 of a conventional enclosed electric clock 22 energized through electric wire 24. The clock 22 is provided with a driveshaft 26 which has a worm gear 28 formed thereon. The drive shaft 26 terminates in a knurled knob 30.

A generally Z-shaped bracket 32 is secured to the base 12 by bolt 34. A hollow transparent shaft 36 defines a reduced end or journal 38 rotatably journalled in a bearing aperture defined in the upper limb of bracket 32. An opening is defined in the cover 16 about which extends a fixed collar 40 through which shaft 36 rotatably extends. Diametrically opposed keys, or such, 42 are fixed to the shaft 36 and are engaged in keyways defined in the globe 44 into the interior of which shaft 36 extends. A gear 46 is fixed to shaft 36 and is meshed with worm gear 28 on driveshaft 26. It will be appreciated that as the driveshaft 26 of clock 22 is turned as wires 24 energize the clock motor, the gear 46 will be caused to rotate which in turn will rotate shaft 36. Inasmuch as the keys 42 are engaged in keyways in the globe 44, the globe will be caused to rotate about the vertical axis defined by the shaft 36.

Figures 3, 4, 5:
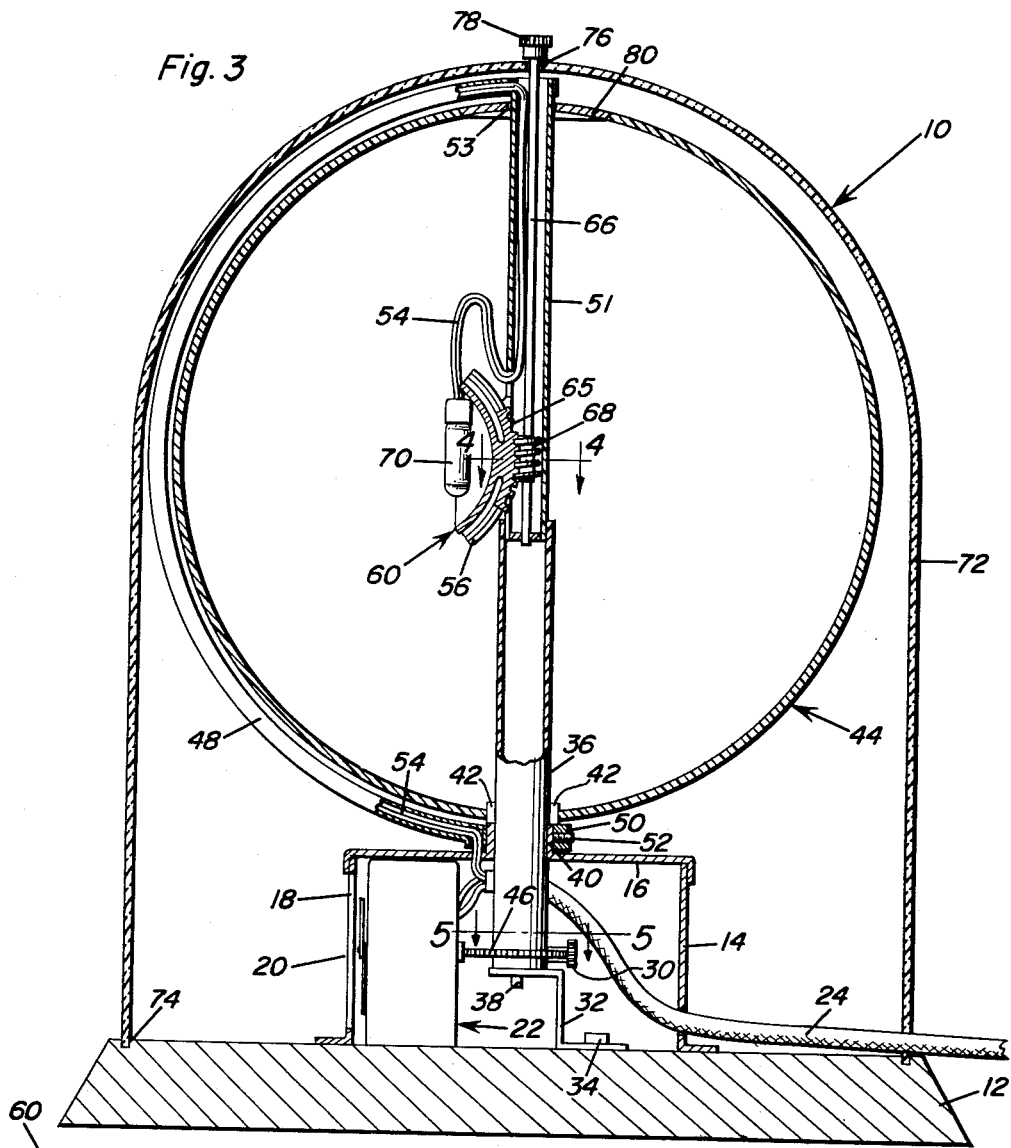
FIGURE 3 is a vertical sectional view taken substantially through the center of the construction.
FIGURE 4 is an enlarged sectional view taken substantially along the plane 4—4 of FIGURE 3.
FIGURE 5 is an enlarged sectional view taken substantially along the plane 5—5 of FIGURE 3.

A hollow support arm 48 has a collar 50 mounted about collar 40 and secured thereto by setscrew 52. The support arm 48 is semi-circular and extends half the distance around the globe 44. A tube 51 is secured at an upper end to a corresponding upper end of the support arm 48 and projects axially into the globe 44 through opening 53 defined therein. The lower end of the tube 51 extends into the shaft 36 and is rotatable with respect thereto. It is to be appreciated that the shaft 36 and tube 51 are transparent while the globe 44 is translucent. Electrical conductor 54 extends through support arm 48 and through tube 51. Tube 51 carries an arcuate guideway 56 which defines a keyway 58 therein. The tube 51 is slotted adjacent the guideway 56 defining a central opening therebetween. Opposed keyways 58 are provided as is particularly indicated in FIGURE 4. A reflector 60 has a rearwardly extending projection 62 which is provided with laterally extending keys 64 riding in keyways 58. The projection 62 terminates in an arcuate rack 65. A rod 66 extends through the tube 51 and has a worm gear 68 fixed thereto. The worm gear 68 is engaged with the rack 65. A light source 70 is carried adjacent the reflector 60 and energized through conductor 54 which extends through the support arm 48 and the tube 51.

A transparent domical housing 72 envelopes the clock and globe and the lower end of the shell-like body is received in a circular groove 74 defined in the base 12. The rod 66 projects through opening 76 in the casing 72 and a knurled knob 78 is received on the end of the rod 66.

The utility and operation of the invention should now be appreciated. It will be noted that the support arm 48 is fixed inasmuch as the setscrew 52 bears against collar 40 so as to lock collar 50 with respect thereto. The clock 22 has a rotating driveshaft 26 which rotates gear 46 through worm gear 28. Gear 46 of course causes shaft 36 to turn which drives globe 44 by virtue of the keys 42. The support arm 48 is aligned with the numeral "12" designating 12 o'clock noon on the base 12. Inasmuch as the clock 22 continually drives the globe 44, and assuming that proper gear ratios are utilized for causing the globe to turn once every twenty-four hours, the support arm 48 will indicate at what portion of the globe it is noon. It will also, of course, be appreciated that by merely referring to the numeral on the base 12 any particular portion of the earth, the local time thereat may be determined. The clock 22 will continue to indicate local time.

The knurled knob 78 is fixed to rod 66 and by rotating rod 66, the worm gear 68 is rotated which causes the movement of rack 65 and the riding of keys 64 in keyways 58. The reflector 60 is thereby moved so as to cast the reflection of the light source 70 upon different areas of the globe 44. In this manner a tilting effect is given to the globe which indicates the different seasons. The upper portion of the globe 44, as at 80 (FIG. 3) is made removable for facilitating the removal and replacement of the light source 70.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A clock and world globe combination comprising: a base, casing means mounted on said base, a clock in said casing means, a translucent globe mounted on said casing means and adapted to be driven by said clock, and adjustable illuminating means supported in said globe; said illuminating means comprising a light source, a reflector, support means for said light source and reflector including a tube extending into the upper portion of the interior of said globe, a rod rotatably mounted and supported in said tube and extending from within said globe to the exterior thereof for manual control, said reflector being disposed about said light source so as to shade a portion of said translucent globe; operating means including a worm gear carried by said rod, rack means on said reflector engaged with said worm gear, and means on said tube for confining motion of said reflector in a vertical plane and in the path of a prescribed arc, whereby the reflector and light source may be tilted up or down relative to the horizontal plane to selectively vary the position of the shade effected on the globe.

References Cited in the file of this patent
UNITED STATES PATENTS

| | | |
|---|---|---|
| 1,122,352 | Agnew | Dec. 29, 1914 |
| 1,515,135 | Alexander | Nov. 11, 1924 |
| 1,959,601 | Schulse | May 22, 1934 |
| 2,055,969 | Farreny | Sept. 29, 1936 |
| 2,068,418 | Kyack | Jan. 19, 1937 |
| 2,280,684 | Bronner | Apr. 21, 1942 |
| 2,300,621 | Dupler | Nov. 3, 1942 |
| 2,307,362 | Dupler | Jan. 5, 1943 |
| 2,907,166 | Baccara | Oct. 6, 1959 |

FOREIGN PATENTS

| | | |
|---|---|---|
| 45,629 | France | Aug. 12, 1935 |

(Addition to No. 772,324)